United States Patent [19]

West et al.

[11] Patent Number: 4,739,773
[45] Date of Patent: Apr. 26, 1988

[54] FEEDING ARRANGEMENT FOR AN AXIAL FLOW ROTARY SEPARATOR

[75] Inventors: Neil L. West, Bettendorf, Iowa; James R. Turner, East Moline, Ill.

[73] Assignee: Deere & Company, Moline, Ill.

[21] Appl. No.: 861,467

[22] Filed: May 9, 1986

[51] Int. Cl.⁴ .................... A01F 7/06; A01F 12/20
[52] U.S. Cl. .................... 130/27 R; 130/27 T
[58] Field of Search ............ 56/14.6; 130/23, 27 R, 130/27 T, 27 AB

[56] References Cited

U.S. PATENT DOCUMENTS

| | | | |
|---|---|---|---|
| 2,154,483 | 4/1939 | Bedolla | 130/27 |
| 3,590,824 | 7/1971 | Gunyou | 130/6 |
| 4,004,404 | 1/1977 | Rowland-Hill et al. | 130/27 T |
| 4,124,032 | 11/1978 | Cowan et al. | 130/27 T |
| 4,178,942 | 12/1979 | Nusser | 130/23 |
| 4,186,753 | 2/1980 | Todd | 130/27 |
| 4,291,709 | 9/1981 | Weber et al. | 130/27 T |
| 4,328,815 | 5/1982 | Rolland-Hill | 130/27 |
| 4,408,618 | 10/1983 | Witzel | 130/23 |
| 4,497,327 | 2/1985 | Hug et al. | 130/27 |
| 4,499,908 | 2/1985 | Niehaus | 130/27 T |
| 4,606,356 | 8/1986 | Odahara | 130/27 T |
| 4,611,605 | 9/1986 | Hall et al. | 130/23 |
| 4,611,606 | 9/1986 | Hall et al. | 130/23 |

FOREIGN PATENT DOCUMENTS 1190237 4/1965 Fed. Rep. of Germany .
3417929 11/1985 Fed. Rep. of Germany .
1352470 5/1974 United Kingdom .

Primary Examiner—Stephen J. Novosad
Assistant Examiner—Bruce M. Kisliuk

[57] ABSTRACT

In a combine harvester having a twin rotor axial flow rotary separator with side-by-side separator portions downstream of a conventional threshing cylinder and concave, crop material is guided by an overhead beater and guide plate into the overhead triangular receiving zone of a casing infeed portion disposed between the separator casings and the threshing cylinder. The triangular opening has, as its base, the transverse beater and for its isosceles sides, converging diagonal or helical edges of the upper semi-cylindrical truncated portion of an infeed casing. The rotors are contra-rotating in a direction such that incoming material is carried downwards into a bite between the rotors and then propelled around a semi-cylindrical lower half of the infeed casing to the outer walls of the casing where continued upward and inward motion is controlled by generally helical guide surfaces so that the material continues in a spiral path downstream within the infeed casing and then into the separator casing proper. Upstream increased diameter paddle-like portions of the respective side-by side rotors reach towards the upstream edge of a center divider wall of the infeed casing and cooperate with that edge and each other to divide incoming material evenly into the respective rotor casings.

30 Claims, 7 Drawing Sheets

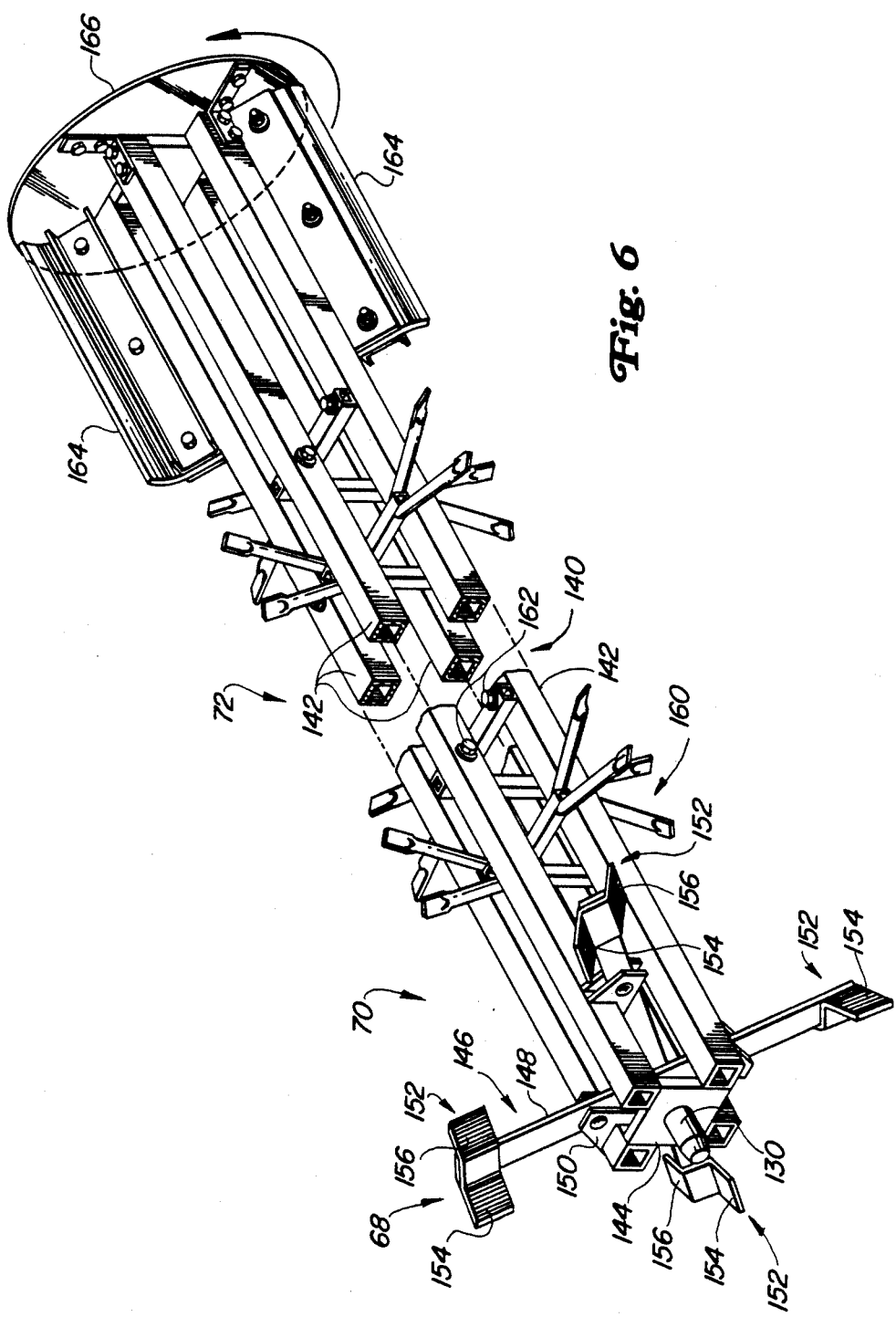

FEEDING ARRANGEMENT FOR AN AXIAL FLOW ROTARY SEPARATOR

CROSS-REFERENCE TO RELATED APPLICATION

U.S. patent application Ser. No. 861,468 13131, filed simultaneously herewith in the name of Hall et al entitled "Axial Flow Rotary Separator" and assigned to the Assignee of the invention herein is directed in a preferred embodiment to a separator with a tined rotor which includes deflectibly mounted crop material engaging elements including at their radial extremities surfaces for deflecting crop material axially. To the extent that the invention disclosed and claimed in application Ser. No. 861,468 is disclosed herein, it is done so only for completeness of description of the operative environment of the invention claimed herein and thus forms no part of the invention claimed herein.

BACKGROUND OF THE INVENTION

This invention concerns a combine harvester in which an axial flow rotary separator receives threshed material from a threshing cylinder and concave extending transversely with respect to the separator and, more particularly, to means for conveying the threshed material from the threshing cylinder and feeding it efficiently to an inlet of the separator. The invention may also be applied to feeding of axial flow rotary separators which include an axial threshing portion.

Combine harvesters in which an axial flow rotary separator consisting of one or perhaps two side-by-side separator units receive threshed material from a cylinder and concave upstream of the separator are well known. See, for example U.S. patent application Ser. No. 646,346, now U.S. Pat. No. 4,611,605 Hall et al, also assigned to the assignee of the present invention. This configuration is attractive. It combines the predictable and well understood virtually universal crop performance of the conventional threshing cylinder and concave (circumferentially fed) and the space-saving potential of the axial flow rotary separator. However, in the most convenient layout, the separator must be fed in a generally axial direction and, as is well known, efficient and trouble-free feeding in this configuration is difficult to achieve. The problem is largely that of bringing a linear stream of crop material into engagement with a rapidly rotating rotor and having it carried smoothly into a separator casing as an annular mat with a minimum of rejection and recirculation of material.

While the arrangement disclosed by Hall functions well in a wide variety of conditions, it has some limitations, manifested in more difficult crop conditions when feeding tends to be pulsating and erratic. In twin rotor machines, material in the feed section may be recirculated around a rotor and transferred from one rotor to the other, with delays of downstream axial indexing of the material and of its entrance into the contained environment of the separator casing proper.

SUMMARY OF THE INVENTION

Accordingly, it is an object of the invention to transfer crop material from the threshing cylinder and concave into the separator proper by means of a transition section which converts a generally axial linear flow of crop material into at least one contained annular mat in a separator casing, smoothly and with a minimum of recirculation or recycling of material while still in the transitional or feed section.

In the case of a separator comprising at least two side-by-side axial flow rotary separator units, downstream of a horizontally transverse threshing cylinder and concave, it is a further object to divide the incoming flow evenly between the separators.

In a preferred form of the invention, the transition section comprises a feed casing extending axially from just downstream of the threshing cylinder and concave and connecting with the inlet of the separator casings. The general form of the feed casing is an upstream concentric extension of the twin separator casings with a bottom half, below the rotor or casing axes, being generally fully semi-cylindrical and an upper half, also semi-cylindrical, but truncated on the diagonal, producing an edge which extends obliquely from upstream to downstream, both with respect to rotor rotation and direction of axial flow of the crop material.

In the case of a twin rotor separator, with closely spaced side-by-side separator units, rotors are counter rotating and, with reference to the infeed direction of the crop material, the rotors turn towards each other so that engaged crop material is carried into a bite between the rotors. Because of the diagonal truncation of the upper portion of the casing, virtually the full length of this bite is open to receive incoming material. But also, by virtue of the particular form of the truncated cylinder upper casing half, after a half rotation, all crop material engaged by the rotors is carried into engagement by the upper half of the casing which is provided with guide vanes for retaining the material within the casing and immediately urging it downstream and into the separator casing proper. Additional control of material in transition may be obtained by depending a radially adjustable, generally arcuately edged wall or bulkhead from the diagonal edge of the truncated upper casing so that it provides a guiding and retaining lip to ensure that material once inside remains inside the confines of the transitional feed casing.

Further control of material, and particularly the prevention of re-circulation of material by transferring it from one side-by-side rotor to the other in a "figure eight", may be obtained by depending a generally upright central wall between the rotors. The function of this dividing wall may be enhanced by using it in cooperation with a pair of stepped diameter rotors, the upstream portions of which have elements of greater swing radius to "wipe" closely to an upstream edge of the divider wall and cooperate to positively divide the material and lead it into the respective side-by-side chambers of the feed or transition section. The increased diameter portion of the rotor may be in the form of paddles which have angled surfaces and which, as well as propelling material circumferentially, helps it begin its axially downstream indexing.

To minimize dead spots and maintain control of material in the feed section, it is desirable, at least in the regions below the rotor, to maintain the casing surfaces relatively close to the sweep of the rotor elements so that a stepped casing, accommodating the relative diameters of the rotor upstream portion and rotor main infeed portion becomes advantageous. With this arrangement, the swept diameter of the main rotor infeed portions and the rotor separator portions, as well as the size of the connecting main infeed and separator casings, may be the same, helping to ensure a smooth transfer from the feed section into the separator casing proper.

Further refinement of the invention is obtained using the forms just described, by using them in cooperation with an overshot beater having an axis parallel to the threshing cylinder and disposed at the upstream entrance of the infeed casing, working with an overhead guide plate to channel material over the beater and into the generally triangular receiving zone above the bite of the rotors. The beater may be fitted with formed deflecting blades and the guide plate may carry vanes for converging material (and for dividing it centrally especially when a central dividing wall is used in the feed casing).

The principles of the feeding arrangement of the invention may also be applied to a combine configuration including a single axial flow rotary separator downstream of a threshing cylinder transverse to the separator. The optional divider wall of the first embodiment just described becomes a tangential wall cooperating with the rotor to define a bite in the same relationship to the triangular feed opening as described above and with the same result of maintaining control of material as soon as it is fully engaged by the rotor at the bite.

BRIEF DESCRIPTION OF THE DRAWINGS

FIG. 6 is a left, front perspective view of the left-hand rotor of the separator.

DESCRIPTION OF THE PREFERRED EMBODIMENT

Figure 1:
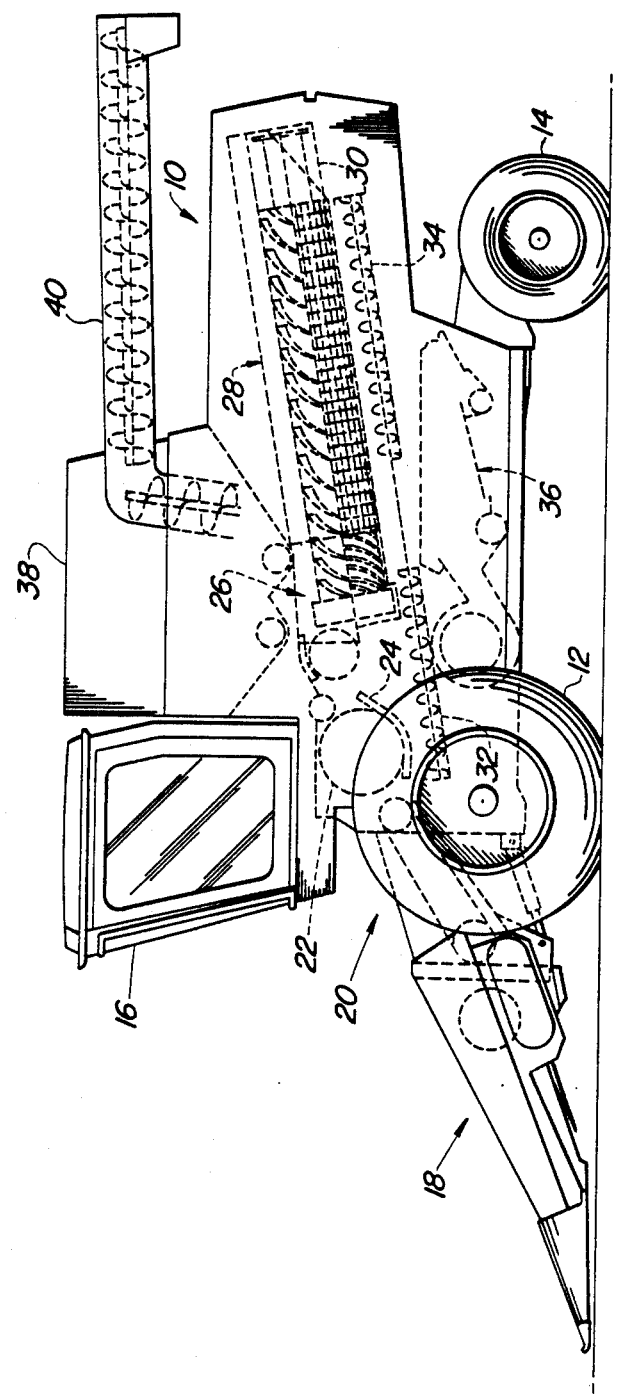
FIG. 1 is a left-hand side elevation of a self-propelled combine embodying the invention.

The invention is embodied in a self-propelled combine harvester as shown in FIG. 1. The combine body 10 is supported on front drive wheels 12 and steerable rear wheels 14 and controlled from an operator's station 16.

Gathering the crop from the field and threshing is by conventional components, the header in this case being a corn head 18 delivering gathered material by way of a feederhouse 20 to a threshing cylinder and concave 22, 24 respectively. Downstream delivery from the threshing cylinder and concave is by means of a separator feed section 26, embodying major aspects of the invention, to the twin rotor axial flow rotary separator 28 which discharges straw at a rear discharge 30. Separated grain is passed downwards to return conveyors 32, 34 for delivery to a conventional cleaning shoe 36. From the cleaning shoe, clean grain is elevated to a grain tank 38 by a clean grain elevator (not shown). Grain is unloaded by unloading auger assembly 40.

The feed section 26 and separator 28 are symmetrical about a longitudinal center line and where there are left- and right-hand elements, only the left-hand element (or portion) will be described.

Figure 2:
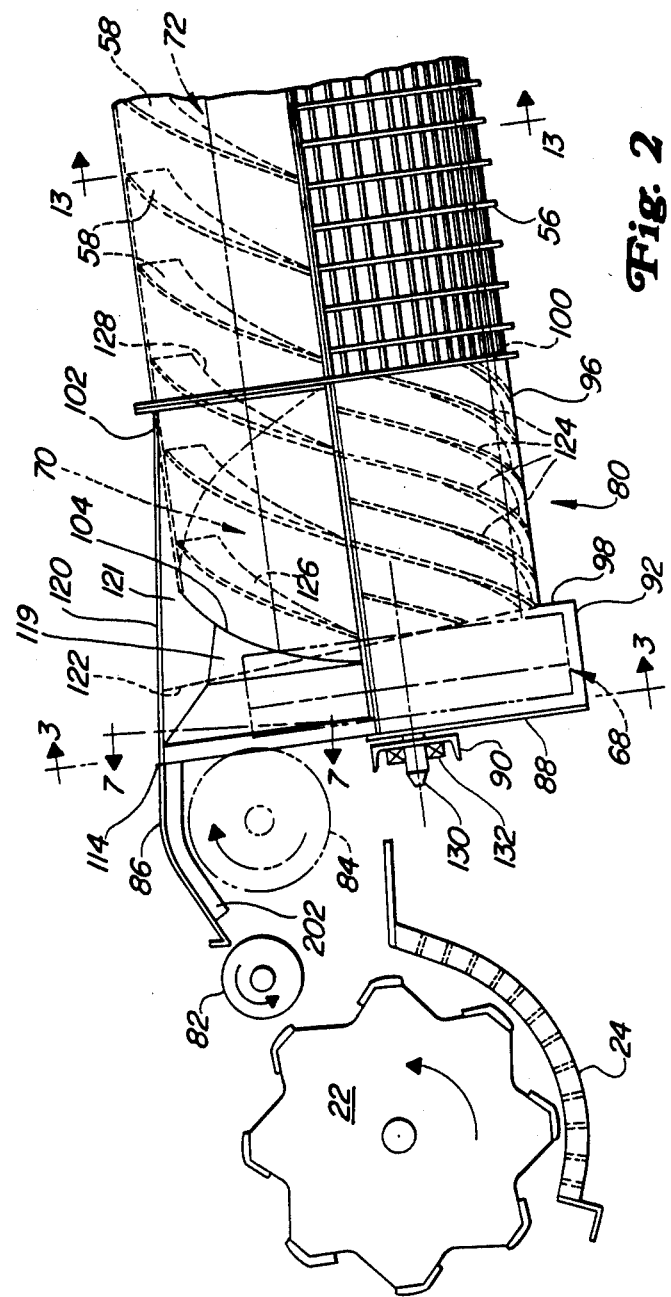
FIG. 2 is an enlarged partial semi-schematic side elevation showing the threshing section, separator feed and a portion of the separator of the combine.
Figure 4:
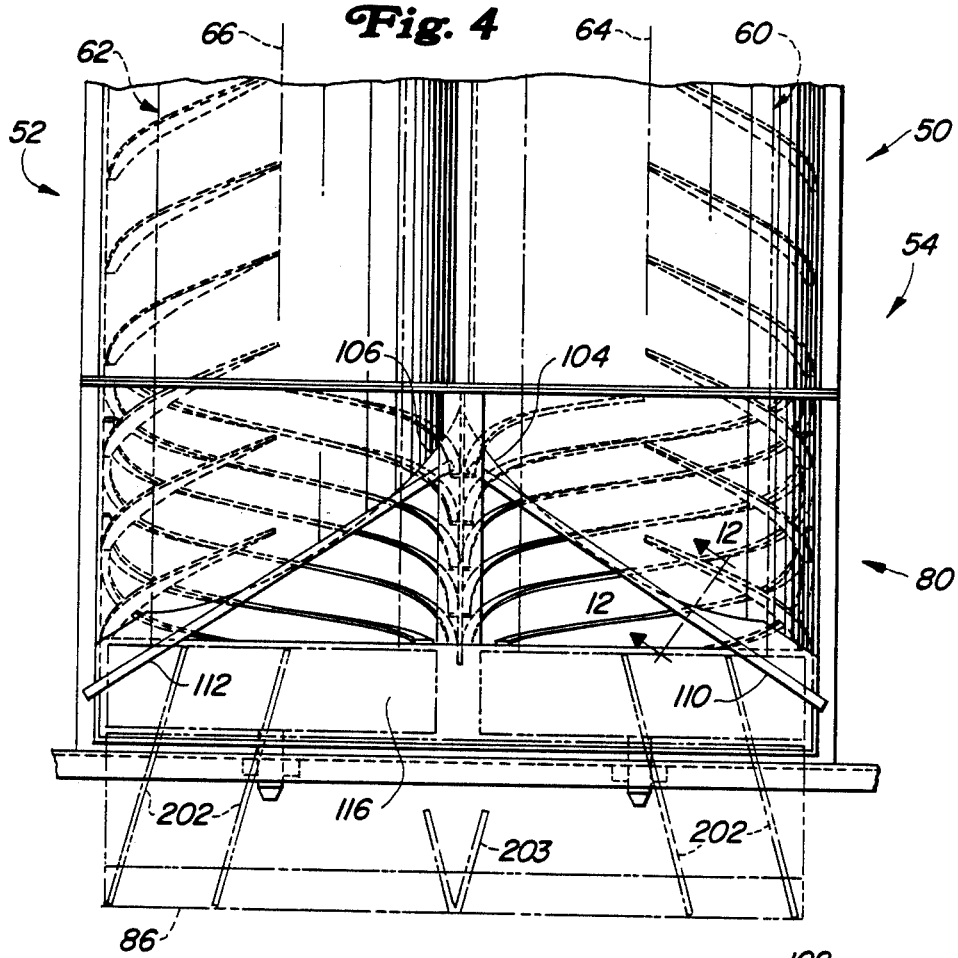
FIG. 4 is a partial overhead view of the separator feed and front portion of the separator of the combine.
Figure 3:
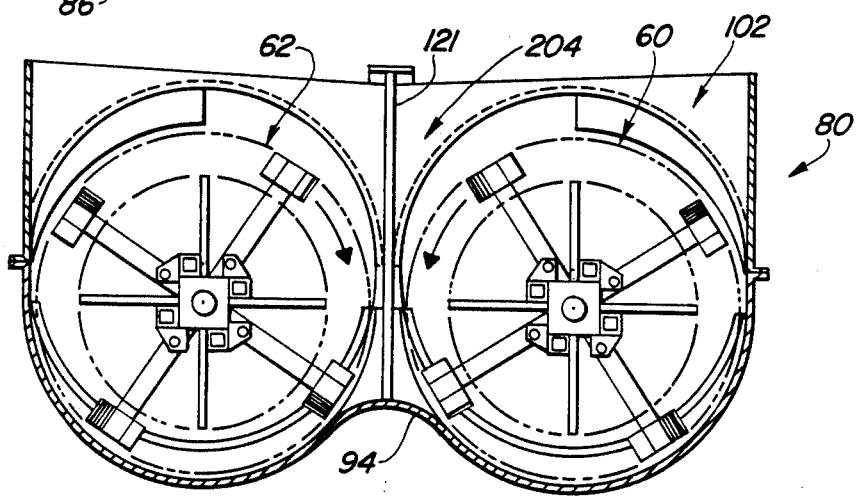
FIG. 3 is a front view of the separator feed and separator portion of the combine taken approximately on line 3—3 of FIG. 2.
Figure 5:
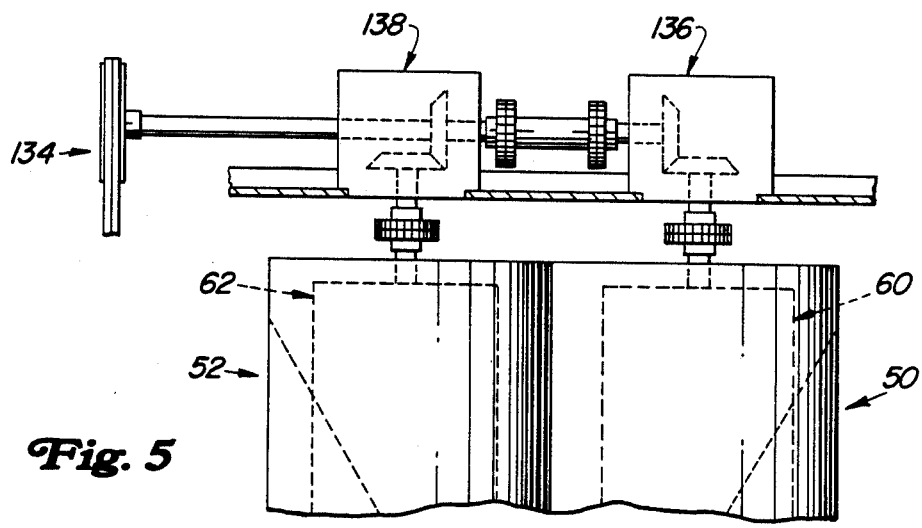
FIG. 5 is a partial overhead view of the downstream end of the separator showing the drive arrangement for the rotors.

As seen best in FIGS. 2, 3 and 4, the separator 28 consists of side-by-side, left- and right-hand separator units 50, 52 respectively. In the left-hand unit, the lower portion of the separator casing 54 is in the form of a grate 56 and it carries in its upper portion a series of helical guide vanes 58. Left-and right-hand rotor assemblies 60, 62 respectively rotate about parallel axes 64, 66. In this pair of identical but opposite hand rotors, the left-hand rotor 64 (best seen in FIG. 6) consists of three main portions, distinguished according to form or function, a front feed or divider portion 68, a main feed section 70 and a separator portion 72. The rotors are described in more detail below.

Looking now in more detail at the feed section 26—the main component is the feed casing 80, the downstream end of which may be defined by the beginning of the grate 56 of separator unit 50. It is preceded by a stripper roll 82 and a beater 84 cooperating with a guide plate 86. The lower half of the upstream end of the feed casing 80 is closed by a front bulk head 88, the upper edge of which is reinforced by a transverse channel member 90. An upstream lower portion 92 of the casing wraps the rotor front or divider portion 68 fairly closely and merges into a central divider hump 94. The main portion 96 of the lower half of the feed casing 80 is also approximatey semicylindrical and of the same diameter but its center is offset upwards relatively and there is a closed step 98 at the transition. There is also a small step 100 upwards at the junction between the feed casing and separator casing due to the casing bottom portion 96 being offset somewhat below the internal surface of the grate 56.

The upper left-hand portion 102 of the feed casing 80 is also of generally semi-cylindrical form, registering with the lower portion 96 and with the left-hand separator casing 54. The semi-cylindrical form of the upper portion 102 is truncated obliquely so that a diagonal edge 104 extends from just downstream of the rotor front portion 68 to meet the corresponding right-hand diagonal edge 106 at the longitudinal center of the feed section 26 adjacent its junction with the separator proper 28. A connector plate 108 sloping downstream and downwardly mates with the diagonal edge 104 and terminates in an approximately horizontal upper edge 110. The corresponding left- and right-hand connector plate upper edges 110, 112 and the transverse downstream edge 114 of the guide plate 86 (or the front transverse plane of the feed casing 80, defined by the front bulk head 88) defines an isosceles triangular top portion 116 of the general opening 118 into the feed casing receiving zone 119. This triangular opening portion 116 is overlaid by a generally horizontal top cover 120.

The feed casing 80 is divided centrally by an upright bulkhead or divider wall 121 whose downwardly and somewhat downstream sloping front edge 122 passes closely adjacent the downstream side of the rotor front portion 68. A series of helical guide ribs 124 span the length of the feed casing bottom portion 96 and extend over about 180 degrees of arc. The inner cylidrical surface defined by the ribs 124 is flush with the inside surface of the separator grate 56. A smaller number but radially deeper series of vanes cover about 90 degrees of arc in the upper portion of the casing including an upstream vane 126 adjacent the helical edge 104 and a downstream vane 128 which extends into the separator casing 54.

Looking now in more detail at the left-hand rotor assembly 60, it is journalled by an upstream shaft 130 in a bearing 132 carried by the channel member 90. The combine engine (not shown) drives the rotors through an input shaft 134, through left- and right-hand bevel gear boxes 136, 138 so that the rotors contra-rotate in the directions shown in FIG. 3.

The rotor frame 140 consists of four parallel longitudinal tubes 142 rigidly attached to and spaced by spacer plates 144. The front or divider rotor portion 68 consists of a pair of paddle assemblies in each of which a diametrical arm 148 secured to the rotor frame 140 by lugs 150 carries at its opposite radial extremities a paddle 152. Each paddle extends circumferentially and includes a pair of downstream facing deflector surfaces 154, 156.

In the present embodiment, identical crop-engaging material elements 160 are used in both the main feed portion 70 and the separator portion 72 of the rotor. Each finger 160 is pivoted to the rotor frame 140 by a pivot 162 permitting it to swing in a plane parallel to the rotor axis of rotation 64. The downstream end of the rotor separator portion 72 consists of a discharge arrangement including a pair of diametrically discharge paddles 164 and a circular baffle plate 166 fixed to the rotor frame 140 and concentric with the rotor axis.

Figure 9:
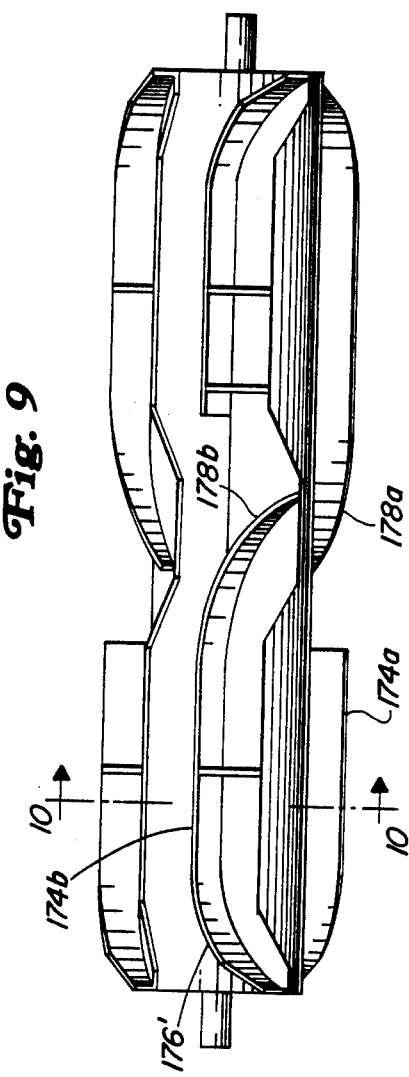
FIG. 9 is a view similar to FIG. 7 of an alternative embodiment beater.
Figure 7:
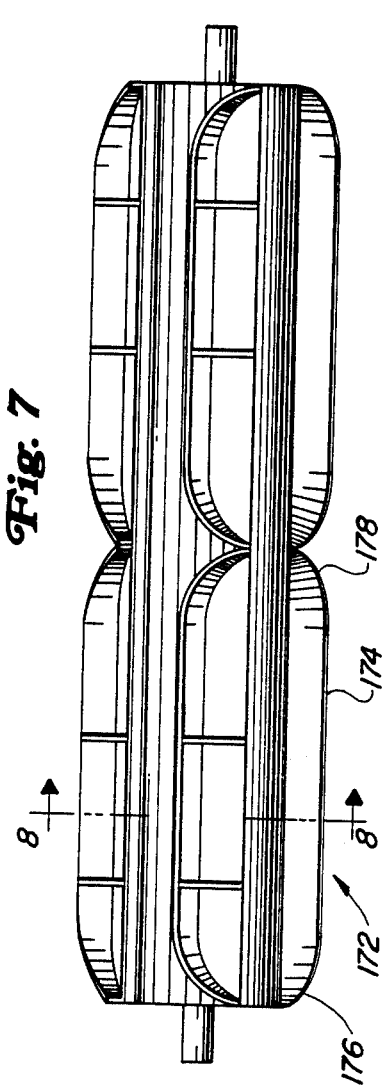
FIG. 7 is a view taken approximately on line 7—7 of FIG. 2 showing the feeder beater of the combine.
Figure 10:
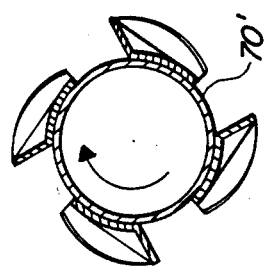
FIG. 10 is a view similar to FIG. 8 of the alternative embodiment beater.
Figure 8:
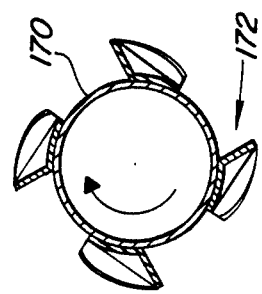
FIG. 8 is a cross-sectional view of the beater taken approximately on line 8—8 of FIG. 7.

In the feeder beater 84, (FIGS. 7 and 8) a tubular core 170 carries four identical blades or material control elements 172. The basic form of these elements is a backward leaning (with respect to direction of rotation) blade portion 174 swept forward at its opposite ends in the form of a wing 176 and at its center to form a "V" 178. In an-alternative embodiment of the feeder beater 84', (FIGS. 9 and 10), the core 170', also carries a four blade arrangement. The outer ends have similar wings 176' but the blades are modified into alternate left- and right-hands 172a and 172b, so that the "V" form (178) is replaced by axially overlapping and alternating oppositely inclined central wing portions 178a, 178b.

Figure 11:
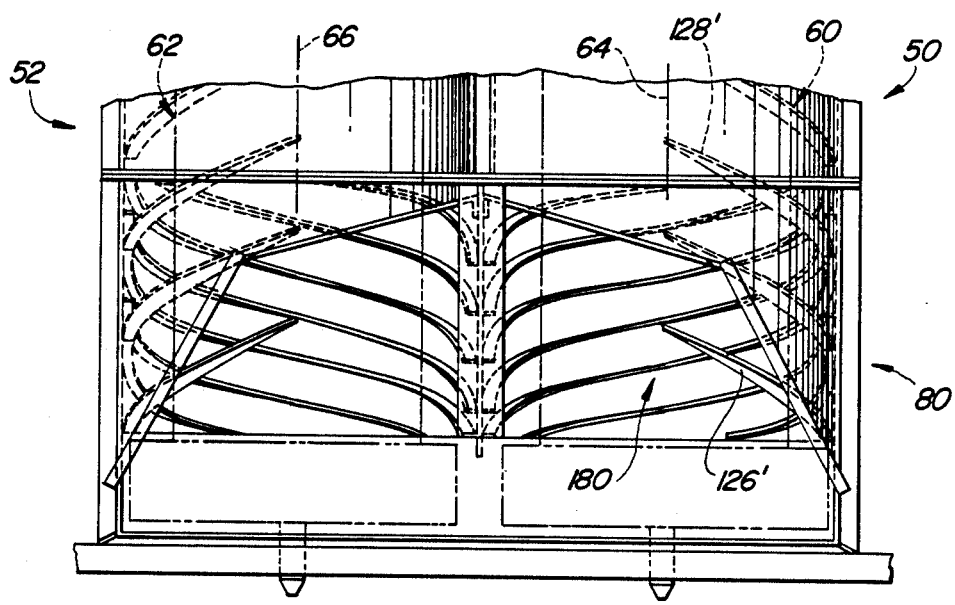
FIG. 11 is a view similar to FIG. 4 showing an alternative arrangement for the upper portion of the feed casing.

The alternative feed section embodiment 180 shown partially in FIG. 11 is essentially similar to the above embodiment (FIGS. 2, 3 and 4) except that the straight diagonal truncation of the casing upper portion 102 has been replaced by a "trapezoidal" form, the truncation in each side or in each separator unit being accomplished by two plane intersections with the cylinder rather than one. The overall effective length of the opening into the tops of the rotors remains the same approximately, but the total area is increased. The form of the vanes 126', 128' remain as before.

Overall harvesting operation of the combine is conventional, except in the feed section 26 and separator 28. Thus, threshed crop material is delivered conventionally, generally rearwardly and upwardly to the feed section 26 of the invention. There, stripper 22 and beater 84 with directions of rotation as shown, guide the material into and through the feeding channel between beater 84 and guide plate 86 to be discharged generally rearwardly at high velocity into the feed receiving zone 119 above the rotor feed portions 68, 70. Dividing and converging the incoming material into separate streams for the respective separator units 50, 52 is begun by the beater 84, (or 84'). The central "V" form 178 (or 178a and 178b) both helps to divide the incoming material and converge it for better reception by the respective rotor portions. The beater outer wings 176, or (176') help converge material from the outside towards the center of the separator in a direction compatible with the generally triangular form of the top of the feed zone 119 and compatible with the direction of movement of crop-engaging elements of the rotor as it passes through this space 119.

Converging guide vanes 202 and 203 on the guide plate 86 (FIGS. 2 and 4) may assist in material control at this point and may be used in conjunction with or as an alternatiye to the material control blades 172, (172a and 172b) of the beater 84, (84')84 '. Some material entering the feed space 119 is engaged by the aggressive rigidly carried paddles 152 of the feed rotor front portion 68. The relatively greater radial reach of this rotor portion and the significant axial extent covered by the paddles 152 in combination and their rigid mounting deals positively with this portion of the incoming material flow. Material is pulled down into the bite 204 between the rotors and at least partially with the cooperation of the front edge 122 of the center wall 121, division of the material into the respective separator units continues. The hump 94 assists in the dividing process and also occupies what otherwise may be a dead spot and contributes to good cleanout of material from this portion of the feed casing. The deflecting surfaces 154, 156 of the paddles 152 urge the material downstream to follow material already directly engaged by the fingers 160 of the rotor feed portion 70 and being urged spirally downstream by the guide ribs 124 in the bottom half of the casing and the guide vanes 126, 128 of the upper outer quadrants of the feed casing.

The triangular or downstream converging form of the upper portion of the feed zone 119 gives a main portion of the incoming flow of material delivered by the beater an opportunity for direct engagement with the rotor feed portions over almost the whole length of the feed casing, at least with regard to the bite 204 between the rotors (or between the respective rotors and center wall 121). However, as can be seen particularly from FIG. 4, essentially all material directly engaged by the fingers 160 and much of that delivered rearwardly by the paddles 152, is carried, after half a revolution in contact with the lower guide ribs 124, outwards and upwards and onto the inner surface of the casing top portion 102. Assisted by the guide vanes 126, 128, (and similarly by the downstream internal surface of the adjustable connector plate extension 210 if fitted—see below and FIG. 12), the material remains under control within this truncated portion of the cylinder and proceeds spirally into the separator casing 54. The operation of a separator rotor with swinging elements similar to the present fingers 160 and in a similar separator casing is described in detail in U.S. patent application Ser. No. 646,346, now U.S. Pat. No. 4,611,605, Hall et al, hereby incorporated by reference.

The particular forms and advantages of the feed arrangement are thus early control, division and convergence through the action of the beater guide plate combination; positive and aggressive treatment at the upstream end of the rotor (and good cleanout); ample opportunity for material to flow into the bite between the rotors, the truncated cylindical form both optimizing the entry and reducing recirculation and regurgitation of material once engaged by the rotors so that it remains under the control of the casing and passes smoothly downstream. Pulsing or hesitation of material in the feed section is much minimized.

The center divider wall is generally of assistance in helping to divide and maintain control of material but given the form and function of the truncated cylinder and vane arrangement is not essential to the principal of operation of the truncated cylinder upper casing portion in which all material, after half a revolution engaged by the fingers of the rotor feed portion 70, is in a position to remain inside the casing.

The feed casing step 98 is shown as perpendicular to the casing bottom portions 92, 96, but may be optionally sloped downstream and upwardly to assist in downstream flow of material.

Figure 12:
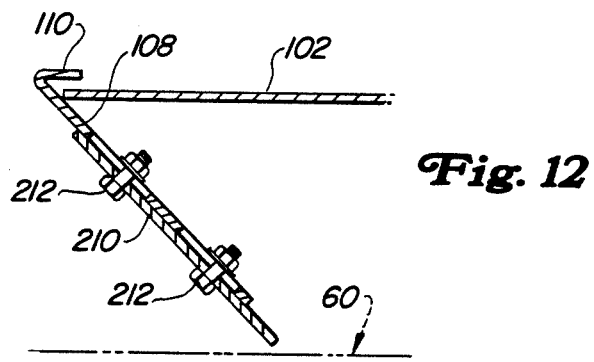
FIG. 12 is an enlarged partial view, approximately on line 12—12 of FIG. 4, of a modification in the infeed casing.

The confining of material within the truncated casing upper portion 102 may be assisted by providing a downward adjustable extension 210 of the connector plate 108, as shown in FIG. 12, with suitable adjustment hardware 212. Both the effective extension of the plate 108 and its effective arc of coverage may be adjusted so that it becomes an adjustable guide vane in a sense. It may be adjusted in a given condition for the best balance between permitting entry of material directly into the casing and providing a retaining surface or lip to retain material already being carried around inside the casing.

Figure 13:
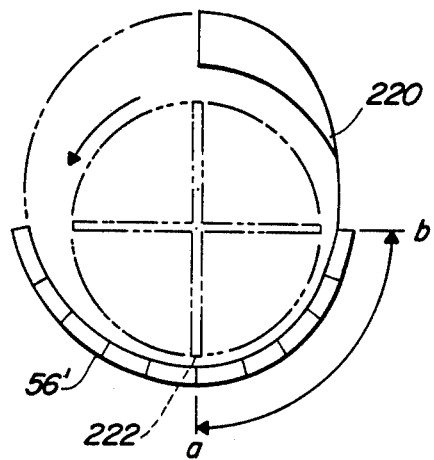
FIG. 13 is a schematic cross-sectional partial view similar to a view on line 13—13 of FIG. 2 showing a modified separator casing.

A modification also concerned with material control is illustrated in FIG. 13. This depicts schematically an intrusion 220 of the casing wall (and of the grate in the separator portion 56') in from the purely cylindrical 221 so as to increase the length of arc a-b of relatively close clearance between rotor element tip 222 and casing or grate 56'. This helps to maintain control of material on the "uphill side" of the separator so that it is released at greater velocity and passes more readily over top-dead-center of the separator and also to improve separation and minimize plugging at the grate.

The well known tendency of axial flow rotary separators to pump air downstream in the same direction as material flow is augmented in the present embodiment by the fan action of the paddles 152 of the feed rotor front portion 68 and by the downstream circular baffle 166, the latter preventing rearward spillage of air and directing it centrifugally to assist the paddles 164 in their straw discharge function.

We claim:

1. In a combine harvester equipped to gather crop material from a field and deliver it to a separator for processing, the separator including a pair of side-by-side axial flow rotary separating units having approximately parallel longitudinal axes of rotation disposed in approximately horizontal common plane, each separator unit including a rotor separator portion surrounded by a generally cylindrical casing separator portion, the rotors each having a frame and being contrarotating so as to establish a bite between them, an infeed arrangement for guiding the crop material into the separator comprising:

a pair of rotor infeed portions constituting an upstream extension of the respective rotor separator portions and having transversely aligned upstream and downstream ends and being closely spaced so as to establish a bite between them, the bite facing towards the delivered crop material;

an infeed casing partially surrounding the rotor infeed portions and including a first dual semi-cylindrical casing half on a first side of the common horizontal plane opposite from the bite and a second partially truncated dual semi-cylindrical casing half on the opposite side of the common horizontal plane; the two halves meeting and registering approximately in the common horizontal plane and substantially surrounding the rotor infeed portions and together defining a pair of cylindrical spaces having downstream outlets registering with the upstream inlet of the respective separator casings and a transversely extending upstream infeed casing end having laterally outer portions, each of said truncations establishing casing edges extending obliquely from the laterally outer portions of the infeed casing end inwardly to a point longitudinally intermediate of the infeed casing thus defining a converging generally triangular infeed receiving zone and exposing an axial extent of the bite between the rotors for direct engagement of incoming material; and the casings including internal helical guide surfaces spanning the axial extent of the casing so that substantially all incoming material once engaged by the rotors, after one half revolution in the first casing half encounters the truncated second casing half and is contained within it and guided axially downstream.

2. The infeed arrangement of claim 1 wherein the rotor infeed portions are disposed downwardly eccentric with regard to the infeed casing and further including a pair of deflector walls extending downstream and downwardly to intersect the second half dual semi-cylindrical portions at their respective truncation edges.

3. The infeed arrangement of claim 2 and further including a pair of cut-off plates overlaying each deflector wall and adjustable to extend the deflector plates into the cylindrical spaces of the infeed casing.

4. The infeed arrangement of claim 1 and further including a central longitudinal dividing wall partially separating the infeed casing into side-by-side chambers upstream of the cylindrical spaces.

5. The infeed arrangement of claim 1 and further including a transverse beater substantially spanning the upstream end of the infeed casing and generally on-the opposite side of the common horizontal plane and a guide plate spanning the length of the beater and disposed on a side of the beater away from the common horizontal plane and cooperating with the beater to define a feeding slot and wherein the direction of the rotation of the beater is such that material delivered to the slot is carried through the slot in an upstream direction and delivered by the beater into the receiving zone of the infeed casing.

6. The infeed arrangement of claim 5 and further including a feed casing cover extending downstream from the guide plate and covering the triangular infeed zone.

7. The infeed arrangement of claim 5 wherein the beater includes a plurality of raised axially extending beater elements, each element modified at a point midway between the ends of the beater to define in terms of beater direction of rotation, a forwardly extending divider to assist in dividing and deflecting incoming material into the respective side-by-side rotors.

8. The infeed arrangement of claim 7 wherein the outer ends of the beater deflector elements are, in terms of beater direction of rotation carried forward to define an inwardly deflecting surface.

9. The infeed arrangement of claim 5 and further including inwardly deflecting guide elements effective in the infeed slot to deflect outer portions of the stream of incoming material towards the center of the infeed casing.

10. The infeed arrangement of claim 1 wherein the upstream end of each of the respective rotor infeed portions includes at least one paddle carried by the respective rotor frame, the paddles of the respective rotors reaching towards one another in the bite between the rotors, to assist in dividing the incoming stream of material.

11. The infeed arrangement of claim 10 wherein the remainder of each rotor infeed portion carries a plurality of generally, radially extending finger-like elements and wherein in operation the paddles and the finger-like elements define respective cylinders of rotation and wherein the cylinder of rotation of the paddles is greater in diameter than that of the rotor fingers.

12. The infeed arrangement of claim 11 wherein the rotor fingers are deflectable with respect to the rotor frame.

13. The infeed arrangement of claim 10 wherein each paddle includes an oblique deflecting surface disposed so that crop material engaged by that surface is urged in a generally downstream direction.

14. In a combine harvester having a threshing cylinder delivering threshed material in a given direction and an axial flow rotary separator also oriented in the given direction and including at least one rotor rotating within a generally cylindrical casing for receiving the threshed crop material and separating grain from it while propelling it downstream in a generally spiral path while maintaining the material in a generally annular mat in contact with the internal surfaces of the separator casing, a feeding arrangement for feeding the threshed crop material into the separator casing for engagement by the rotor separator portion, comprising:
a rotor infeed portion having a periphery of revolution and coaxial with the rotor separator portion and extending upstream of the separator casing and drive means for driving the rotor infeed portion in the same direction as the rotor separator portion, and
a generally cylindrical feed casing partially surrounding the rotor infeed portion including a semi-cylindrical lower half having a generally longitudinal rotationally upstream edge, a generally upright wall tangential to the upstream edge and a truncated, semi-cylindrical upper half registering with the lower half, said truncation constituting the omission of an upstream portion of the semi-cylindrical casing adjacent the tangential wall and defined by a generally helical upstream edge of the casing upper half extending to intersect the tangential wall and define a generally triangular radially upward and outward facing opening, the base of the triangle being defined by a transverse plane at the upstream end of the rotor infeed portion, and the rotor direction being such as to carry threshed material towards a bite between the tangential wall and the rotor periphery.

15. The feeding arrangement of claim 14 and further including at least one helically arranged internal guide vane carried by the upper half of the feed casing.

16. The feeding arrangement of claim 14 and further including a plurality of helical guide surfaces carried by the inside surface of the semi-cylindrical lower half of the casing for cooperating with the rotor infeed portion in propelling received threshed crop material spirally downstream.

17. The feeding arrangement of claim 14 and further including a connecting wall sloping radially inwards and downstream to connect with the helical edge of the semi-cylindrical upper half of the casing and wherein said connecting wall includes an upper outer edge extending generally in the direction of downstream spiralling material flow and defining an oblique side of the triangular inlet opening.

18. The feeding arrangement of claim 17 wherein the at least one helical guide surface carried internally of the semi-cylindrical upper half of the casing feed portion extends close to and approximately parallel to the intersection of the connecting wall and the upper half cylindrical wall.

19. The feeding arrangement of claim 14 wherein the rotor infeed portion includes a plurality of generally radially extending rotor elements and the radial extent of the elements at the upstream end is greater than that of the elements of the remainder of the rotor infeed portion.

20. The feeding arrangement of claim 19 wherein the upstream end of the semi-cylindrical lower half of the infeed casing is enlarged to accommodate the upstream rotor elements.

21. The feeding arrangement of claim 14 wherein the rotor infeed portion includes a frame mounted for rotation in the casing and carrying a plurality of generally radially extending finger-like elements, each element being deflectible relative to the rotor frame within a plane extending generally axially with respect to the axis of rotation of the rotor.

22. The feeding arrangement of claim 14 wherein the rotor infeed portion is carried eccentrically within the casing, the eccentricity being in a direction generally away from the triangular infeed opening.

23. In a combine harvester equipped to gather crop material from a field and deliver it in a stream of material to a separator for processing, the separator including a pair of side-by-side axial flow rotary separator units, each unit including an infeed portion in which rotor infeed portions extend into an infeed casing having an infeed opening above the rotors and a casing floor portion below the rotors and the direction of rotors is such that when the stream of material is delivered through the inlet it is carried by the rotors into a bite between the rotors and downwards through the bite towards the floor, said bite having an axial extent, characterized in including a generally vertical and axially extending divider wall extending adjacent a downstream portion of the bite so that the downstream portion of the infeed casing is divided into two chambers.

24. The infeed arrangement of claim 23 wherein the infeed opening is generally triangular and converges to a point adjacent the downstream end of the divider wall.

25. An axial flow rotary separator having a generally cylindrical casing wall within which crop material engaging elements of an axially extending rotor propel crop material spirally downstream in a generally annular mat in contact with the casing wall, the rotor axis being offset from the center of the casing and the separator including elements for indexing material axially while it is being propelled circumferentially, the rotor offset establishing a zone of engagement said zone having, in terms of rotor rotation, an upstream portion in which the crop material engaging elements approach the casing wall and a downstream portion in which the elements diverge from the wall as the rotor rotates, characterized in that the casing is formed inwards adjacent the downstream portion of the zone of engagement so as to postpone the divergence of the crop material engaging elements from the casing wall.

26. The separator of claim 25 further characterized in that the casing wall includes a foraminous portion substantially spanning the zone of engagement.

27. In a combine harvester equipped for gathering crop material from a field and delivering it in a stream of material to a separator for processing the separator including a pair of side-by-side closely spaced axial flow rotary separator units, an infeed arrangement for receiving the stream of material, comprising:

an upstream rotor infeed portion of each rotor;

means for rotating said rotor portions in opposite directions so that the incoming stream of material is received by the rotor portions and carried through a bite downwardly between the rotors; and a plurality of crop material engaging elements carried by the rotor infeed portions including an upstream portion having a plurality of radially extending crop material engaging elements defining a first swept diameter and a downstream portion including a plurality of radially extending crop material engaging elements defining a second swept diameter less than that of the first.

28. The infeed arrangement of claim 27 and further including a longitudinal extending divider wall disposed above the bite between the rotor infeed portions and approximately axially coextensive with the infeed rotor downstream portion and having an upstream edge extending adjacent the rotor infeed upstream portions so that the crop material engaging elements of said upstream portion effectively sweep said upstream edge.

29. In a combine harvester having an axial flow rotary separator comprising a pair of side-by-side axial flow rotary separator units, the separator including an upstream feed portion having an inlet opening generally upwards and a transverse conventional threshing cylinder and concave having a discharge point adjacent and upstream of the inlet and generally above the axis of the separator rotors, an auxiliary feeding device for assisting the transfer of material from the threshing cylinder and concave discharge point to the separator units by way of the inlet comprising:

a beater rotatable about a transverse axis parallel to the axis of the threshing cylinder and disposed generally above the axes of the separator rotors, the beater including a frame, said frame carrying crop material engaging elements including a plurality of oblique guide surfaces including one such surface at each lateral end of the beater and at least a pair of such surfaces towards the center of the beater for contributing to the division of the flow of crom material into separate streams, one for each separator unit, and converging each of those streams in a downstream direction;

a guide plate partially wrapping the beater on its upper side and defining, between the guide plate and the beater, a feeding slot, the guide plate extending downstream and termininating in a discharge guide surface, the direction of rotation of the beater being such as to convey through the feeding slot crop material delivered to it by the threshing cylinder and concave discharge and the guide discharge surface being disposed to deflect material generally into the inlet of the separator; and oblique guide elements carried by the guide plate and effective in the feeding slot for converging conveyed crop material inwardly towards the center of the separator.

30. The auxiliary feeding device in claim 29 and further including guide elements disposed at the lateral center of the guide plate generally in the form of a V opening downstream for dividing the flow of material into two portion one for each separator unit.

* * * * *